(12) United States Patent
Shiraishi (10) Patent No.: US 10,493,982 B2
(45) Date of Patent: Dec. 3, 2019

(54) VEHICLE CONTROL DEVICE AND VEHICLE CONTROL SYSTEM

(71) Applicant: TOYOTA JIDOSHA KABUSHIKI KAISHA, Toyota-shi, Aichi-ken (JP)

(72) Inventor: Tatsuya Shiraishi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 3 days.

(21) Appl. No.: 15/110,763

(22) PCT Filed: Dec. 19, 2014

(86) PCT No.: PCT/JP2014/084735
§ 371 (c)(1),
(2) Date: Jul. 11, 2016

(87) PCT Pub. No.: WO2015/118792
PCT Pub. Date: Aug. 13, 2015

(65) Prior Publication Data
US 2016/0332622 A1    Nov. 17, 2016

(30) Foreign Application Priority Data

Feb. 7, 2014    (JP) ................................ 2014-022844

(51) Int. Cl.
*B60W 30/09*    (2012.01)
*B60W 10/04*    (2006.01)
(Continued)

(52) U.S. Cl.
CPC ............ *B60W 30/08* (2013.01); *B60W 10/04* (2013.01); *B60W 10/18* (2013.01);
(Continued)

(58) Field of Classification Search
CPC .. B60W 30/08; B60W 30/143; B60W 30/146; B60W 30/16; B60W 30/162; B60W 10/04; B60W 10/06; B60W 10/18; B60W 10/184; B60W 40/08; B60W 2030/082; B60W 2040/0818; B60W 2420/42;
(Continued)

(56) References Cited

U.S. PATENT DOCUMENTS 5,014,804 A  *  5/1991  Suzuki ................. B60K 31/047
                                                          123/350
7,844,384 B2 * 11/2010  Seto .......................... B60T 7/22
                                                          362/466

(Continued)

FOREIGN PATENT DOCUMENTS

CN       103517844 A      1/2014
DE    10 2011 114 072 A1  3/2013
(Continued)

*Primary Examiner* — Thomas E Worden
(74) *Attorney, Agent, or Firm* — Sughrue Mion, PLLC (57) ABSTRACT

A vehicle control device includes a vehicle speed control unit configured to execute a vehicle speed control for automatically accelerating a vehicle, regardless of an accelerator operation. The vehicle speed control unit prohibits an execution of the vehicle speed control during a predetermined period, after a detection is made that the vehicle collided, and permits the execution of the vehicle speed control after an elapse of the predetermined period.

8 Claims, 2 Drawing Sheets

(51) Int. Cl.
*B60W 10/18* (2012.01)
*B60W 30/14* (2006.01)
*B60W 30/16* (2012.01)
*B60W 40/08* (2012.01)
*B60W 30/08* (2012.01)

(52) U.S. Cl.
CPC ........ *B60W 30/146* (2013.01); *B60W 30/162* (2013.01); *B60W 40/08* (2013.01); *B60W 2030/082* (2013.01); *B60W 2040/0818* (2013.01); *B60W 2420/42* (2013.01); *B60W 2420/50* (2013.01); *B60W 2420/52* (2013.01); *B60W 2420/62* (2013.01); *B60W 2520/105* (2013.01); *B60W 2520/125* (2013.01); *B60W 2540/22* (2013.01); *B60W 2540/26* (2013.01); *B60W 2550/10* (2013.01); *B60W 2720/10* (2013.01); *B60W 2750/308* (2013.01)

(58) Field of Classification Search
CPC ......... B60W 2420/50; B60W 2420/52; B60W 2420/62; B60W 2520/105; B60W 2520/125; B60W 2540/22; B60W 2540/26; B60W 2550/10; B60W 2720/10; B60W 2720/106; B60W 2750/308; B60R 21/013; B60T 7/22; B60T 2201/022; B60K 28/14
See application file for complete search history.

(56) References Cited

U.S. PATENT DOCUMENTS

| | | | | |
|---|---|---|---|---|
| 8,311,720 | B2* | 11/2012 | Pelosse | B60W 30/16 123/349 |
| 9,008,940 | B2* | 4/2015 | Ueyama | B60W 30/095 340/435 |
| 9,156,354 | B2* | 10/2015 | Rossi | B60T 7/22 |
| 9,555,705 | B2* | 1/2017 | Kaita | B60T 7/22 |
| 2003/0158648 | A1* | 8/2003 | Kubota | B60K 31/0008 701/96 |
| 2008/0147277 | A1* | 6/2008 | Lu | B60W 30/085 701/45 |
| 2011/0238272 | A1* | 9/2011 | Kato | B60W 10/06 701/55 |
| 2012/0191313 | A1* | 7/2012 | Miyahara | B60K 28/14 701/70 |
| 2014/0074372 | A1* | 3/2014 | Kaita | B60T 7/22 701/99 |
| 2014/0180530 | A1* | 6/2014 | Wanami | B60R 21/0136 701/32.2 |
| 2014/0207352 | A1* | 7/2014 | Rossi | B60T 7/22 701/70 |

FOREIGN PATENT DOCUMENTS

| | | |
|---|---|---|
| JP | 2004-345518 A | 12/2004 |
| JP | 2013-1188 A | 1/2013 |
| WO | 2012/153416 A1 | 11/2012 |

* cited by examiner

FIG. 1

VEHICLE CONTROL DEVICE AND VEHICLE CONTROL SYSTEM

CROSS REFERENCE TO RELATED APPLICATIONS

This application is a National Stage of International Application No. PCT/JP2014/084735 filed Dec. 19, 2014 claiming priority based on Japanese Patent Application No. 2014-022844, filed Feb. 7, 2014, the contents of which are incorporated herein by reference in their entirety.

TECHNICAL FIELD

The present invention relates to a vehicle control device and a vehicle control system.

BACKGROUND ART

A conventional vehicle control device and a vehicle control system includes, for example, a vehicle control device capable of executing a vehicle speed control (so-called ACC control) for controlling a vehicle speed of an own vehicle and controlling an inter-vehicle distance between a preceding vehicle and the own vehicle, and an avoiding control (so-called PCS control) for avoiding collision between a collision determination target and the own vehicle when determined that the possibility that the collision determination target and the own vehicle will collide is high, as disclosed in patent literature 1. The vehicle control device stops the vehicle speed control when the avoiding control is carried out. Thus, in a situation where a braking device of the own vehicle is controlled by the avoiding control thus stopping the own vehicle, the vehicle control device, for example, suppresses an event where the own vehicle stops in a manner slanted with respect to an advancing direction so that when the vehicle speed control is returned thereafter, a sensor for detecting the inter-vehicle distance detects another vehicle, and the like in the adjacent lane instead of the preceding vehicle and the own vehicle follows the other vehicle in the adjacent lane.

CITATION LIST

Patent Literature

Patent literature 1: Japanese Patent Application Laid-open No. 2013-001188

DISCLOSURE OF INVENTION

Problems to be Solved by the Invention

In the vehicle control device described in patent literature 1, the position, direction and the like of the own vehicle may change by the collision. But after the collision due to various factors, for example, the avoiding control did not operate, when the vehicle speed control for automatically accelerating the vehicle according to the inter-vehicle distance and the like regardless of the accelerator operation by the driver is continued, the vehicle may be automatically accelerated regardless of the accelerator operation by the driver such as the own vehicle following the other vehicle and the like in the adjacent lane, thereby the possibility of the vehicle behavior not intended by the driver occurring may temporarily rise, until the position and the direction of the own vehicle are corrected to an appropriate state.

In light of the foregoing, it is an object of the present invention to provide a vehicle control device and a vehicle control system that can suppress the vehicle behavior not intended by the driver from occurring after the collision.

Solutions to the Problems

A vehicle control device according to the present invention includes a vehicle speed control unit configured to execute a vehicle speed control for automatically accelerating a vehicle, regardless of an accelerator operation. Here, the vehicle speed control unit prohibits an execution of the vehicle speed control during a predetermined period, after a detection is made that the vehicle collided, and permits the execution of the vehicle speed control after an elapse of the predetermined period.

Further, in the vehicle control device, it is preferable that while the vehicle speed control is being executed at time of a detection of the collision of the vehicle, the vehicle speed control unit interrupts the vehicle speed control during the predetermined period, and permits a return of the vehicle speed control after the elapse of the predetermined time.

Further, in the vehicle control device, it is preferable that the vehicle speed control unit starts the vehicle speed control in response to a start operation, and while the vehicle speed control is not being executed at the time of the detection of the collision of the vehicle, the vehicle speed control unit does not permit a start of the vehicle speed control in response to the start operation during the predetermined period, and permits the start of the vehicle speed control in response to the start operation after the elapse of the predetermined time.

Further, in the vehicle control device, it is preferable that the vehicle speed control unit executes an inter-vehicle distance control as the vehicle speed control by detecting an inter-vehicle distance of the vehicle and a preceding vehicle of the vehicle, and automatically accelerating the vehicle in response to the inter-vehicle distance, regardless of the accelerator operation, so as to follow the preceding vehicle and maintain the inter-vehicle distance at a predetermined distance.

Further, in the vehicle control device, it is preferable that the vehicle control device further includes an automatic brake control unit configured to execute an automatic brake control for controlling the vehicle and automatically decelerating the vehicle, at the time the detection is made that the vehicle collided. Here, at the time the detection is made that the vehicle collided and the automatic brake control is executed by the automatic brake control unit, the vehicle speed control unit permits an acceleration of the vehicle in response to the accelerator operation after the automatic brake control is canceled until before the elapse of the predetermined period, and permits the execution of the vehicle speed control in addition to the acceleration of the vehicle in response to the accelerator operation after the elapse of the predetermined period.

A vehicle control system according to the present invention includes a collision detection device configured to detect that a vehicle collided with an object at an exterior of the vehicle; and a vehicle control device configured to execute a vehicle speed control for automatically accelerating the vehicle regardless of an accelerator operation. Here, the vehicle control device prohibits execution of the vehicle speed control during a predetermined period after detection is made by the collision detection device that the vehicle collided, and permits the execution of the vehicle speed control after elapse of the predetermined period.

Effects of the Invention

A vehicle control device and a vehicle control system according to the present invention have an effect in being able to suppress the vehicle behavior not intended by a driver from occurring after the collision, since the execution of the vehicle speed control is prohibited during a predetermined period after detection is made that the vehicle collided, and the execution of the vehicle speed control is permitted after elapse of the predetermined period.

DESCRIPTION OF EMBODIMENTS

An embodiment according to the present invention will be hereinafter described in detail based on the drawings. The present invention is not limited by the embodiment. The configuring elements in the following embodiment include elements easily replaceable by those skilled in the art or substantially the same elements.

Embodiment

Figure 1:
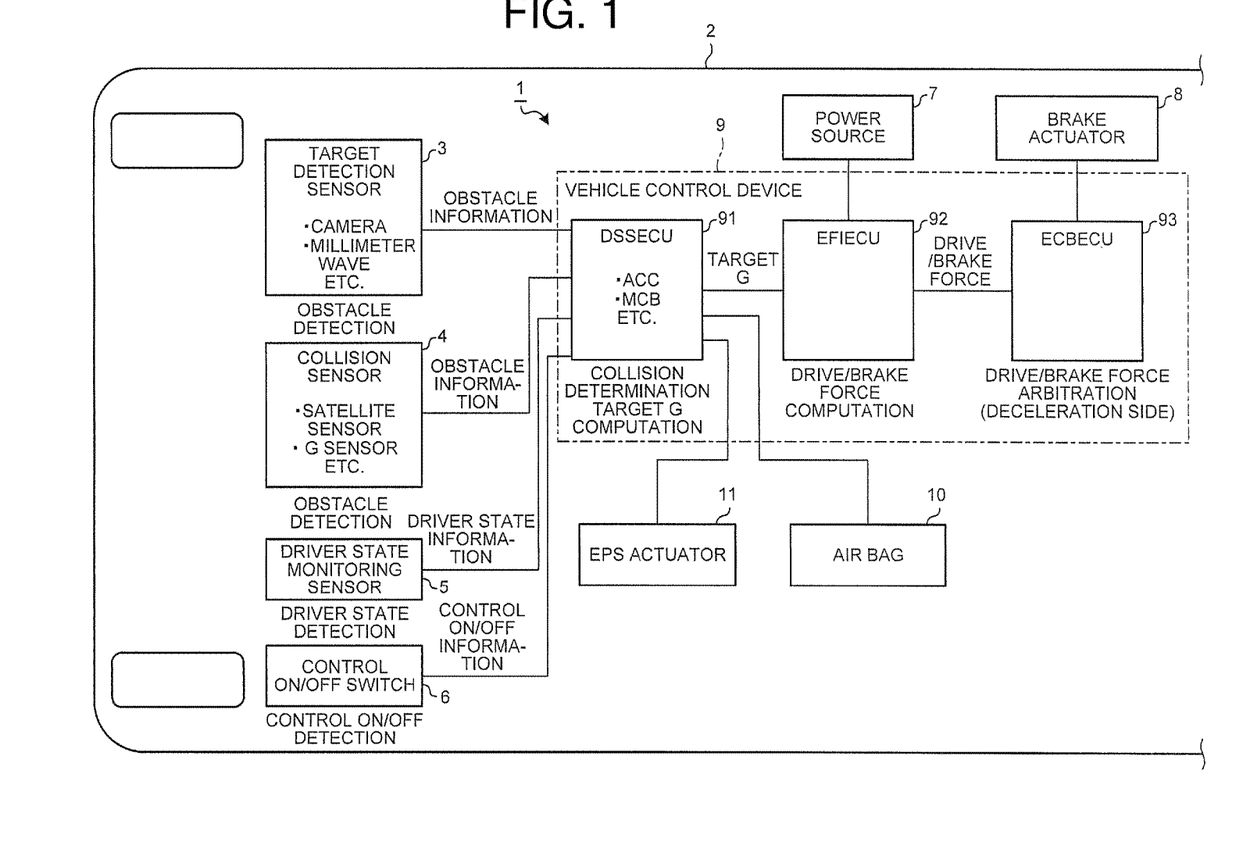
FIG. 1 is a schematic configuration diagram illustrating a vehicle control system according to an embodiment.
Figure 2:
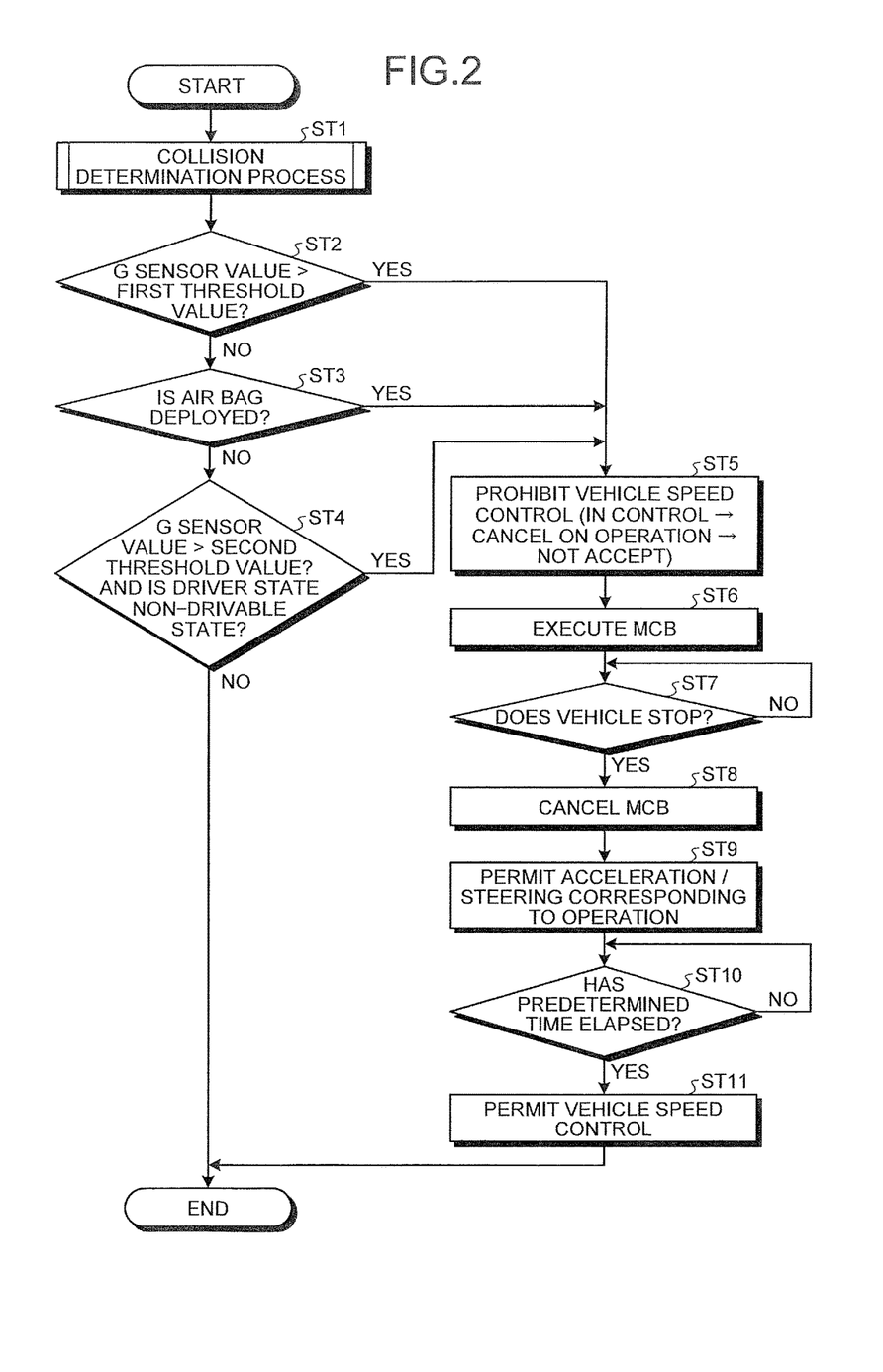
FIG. 2 is a flowchart illustrating an example of a control flow by a vehicle control device according to the embodiment.

FIG. 1 is a schematic configuration diagram illustrating a vehicle control system according to an embodiment. FIG. 2 is a flowchart illustrating one example of a control flow by a vehicle control device according to the embodiment.

A vehicle control system 1 according to the present embodiment illustrated in FIG. 1 is a system that is mounted on a vehicle 2 serving as an own vehicle to control the vehicle 2. Typically, the vehicle control system 1 is a collision damage reducing system that can execute the vehicle speed control for automatically controlling the vehicle speed of the vehicle 2, and that prohibits the execution of the vehicle speed control during a predetermined period when detection is made that the vehicle 2 collided, so as to suppress the vehicle behavior not intended by a driver from occurring after the collision thus suppressing a secondary collision, and the like. The vehicle control system 1 of the present embodiment further has a function of a MCB (Multi Crash mitigation Brake) control serving as a so-called automatic brake control that rapidly controls the braking device of the vehicle 2 and reduces motion energy of the vehicle 2 as fast as possible, so as to safely guide a passenger when a primary collision is detected. The vehicle control system 1 of the present embodiment is realized by mounting the configuring element illustrated in FIG. 1 on the vehicle 2.

Specifically, as illustrated in FIG. 1, the vehicle control system 1 of the present embodiment includes a target detection sensor 3 serving as a sensor for monitoring the perimeter of the vehicle, a collision sensor 4 serving as a collision detection device, a driver state monitoring sensor 5 serving as a monitoring device, a control ON/OFF switch (ACC switch) 6 serving as a control start operation detection device, a power source 7, a brake actuator 8, a vehicle control device 9, and an air bag 10. The vehicle control device 9 is configured to include a DSS (Driver Support System) ECU (Electronic Control Unit) 91, an EFI (Electronic Fuel Injection) ECU 92, and an ECB (Electronically Controlled Brake) ECU 93.

The target detection sensor 3 detects an object existing at the perimeter of the vehicle 2. The target detection sensor 3, for example, can use any of a perimeter monitoring CCD camera (imaging device) and an image recognition device thereof, a radar using millimeter wave radar, infrared light, and the like, a laser radar using a laser light, a close-range radar such as a UWB (Ultra Wide Band) radar, and the like, a sonar using a sound wave or an ultrasonic wave of an audible region, and the like. The target detection sensor 3 detects the object at the periphery of the vehicle 2 to perform an obstacle (target) detection, and the like. For the obstacle detection, the target detection sensor 3 detects, for example, a three-dimensional object (target) such as a pedestrian at the periphery of the vehicle 2, another vehicle at the periphery of the vehicle 2 (includes at least a preceding vehicle travelling ahead in a travelling direction of the vehicle 2), a telephone pole, an obstacle, a guard rail, a wall surface, and the like. The target detection sensor 3 can also detect an object at the periphery of the vehicle 2 and detect a relative physical quantity indicating a relative relationship of the detected object and the vehicle 2. The target detection sensor 3, for example, detects at least one of a relative position (coordinate system) of the vehicle 2 and the object, a relative speed (m/s), a relative distance (m), a TTC (Time-To-Collision: contact margin time) (s), and the like as the relative physical quantity. The TTC (hereinafter sometimes referred to as "relative time") corresponds to a time until the vehicle 2 reaches the object, and corresponds to a time in which the relative distance of the vehicle 2 and the object is converted according to the relative speed. The target detection sensor 3 is electrically connected to the DSSECU 91 of the vehicle control device 9, and outputs obstacle information (includes relative physical quantity, etc.) based on the detection of the obstacle to the DSSECU 91.

The collision sensor 4 detects for the detection of the collision that the vehicle 2 collided with the object (obstacle) exterior to the vehicle 2 (vehicle exterior). For example, the collision sensor 4 can use a satellite sensor attached to the front part of the vehicle 2, a G sensor attached to a vehicle body of the vehicle 2, a combination thereof, or the like. The collision sensor 4 is configured to include at least the G sensor. The G sensor configuring the collision sensor 4 detects the acceleration that acts on the vehicle 2 (hereinafter sometimes referred to as "vehicle acceleration"). The G sensor configuring the collision sensor 4 detects a vehicle acceleration (front-back G) that acts along the front and back direction of the vehicle 2 and a vehicle acceleration (lateral G) that acts along the lateral direction orthogonal thereto. The collision sensor 4 is electrically connected to the DSSECU 91 of the vehicle control device 9, and outputs the collision information (including front-back G, lateral G, etc.) based on the detection of the collision to the DSSECU 91.

The driver state monitoring sensor 5 monitors the state of the driver of the vehicle 2. For example, the driver state monitoring sensor 5 of the present embodiment is configured to include a camera, and the like for imaging the face of the driver of the vehicle 2. The driver state monitoring sensor 5 of the present embodiment monitors, for the driver state detection, the face position, the face direction, the opening of the eye, the closing of the eye, presence or absence of conscious, whether or not in a panic state, and the like of the driver through the camera. The driver state monitoring sensor 5 may be configured to include various measurement instruments such as a heart rate meter for measuring the heart rate of the driver, and the like, in addition to the camera. The driver state monitoring sensor 5 is electrically connected to the DSSECU 91 of the vehicle control device 9, and outputs the driver state information (including face position, the face direction, the opening of the eye, the closing of the eye, the presence or absence of conscious, whether or not in the panic state of the driver, etc.) based on the detection of the driver state to the DSSECU 91.

The control ON/OFF switch 6 detects, for the detection of the control ON/OFF, the start operation (ON operation) of the vehicle speed control by the passenger of the vehicle 2 and the end operation (OFF operation) of the vehicle speed control. The control ON/OFF switch 6 is electrically connected to the DSSECU 91 of the vehicle control device 9, and outputs the control ON/OFF information (including presence or absence of the start operation, the end operation, etc.) based on the detection of the control ON/OFF to the DSSECU 91.

The power source 7 is a travelling power source (motor) of the vehicle 2 such as an engine, a motor generator. The vehicle 2 will be described as a conventional vehicle that includes the engine but does not include the motor generator for the power source 7, but may be a vehicle of any type such as a HV (hybrid) vehicle that includes both the engine and the motor generator, an EV (electrical) vehicle that includes the motor generator but does not include the engine, and the like.

The brake actuator 8 configures the braking device mounted on the vehicle 2, and is an actuator for causing wheels of the vehicle 2 to generate a braking force. Typically, the brake actuator 8 is an actuator of an electronic control type brake device, but may be, for example, an actuator of a device for causing the wheels of the vehicle 2 to generate the braking force by the parking brake or the engine brake. The brake actuator 8 can, for example, automatically generate the braking force by the control of the vehicle control device 9 without depending on the driving of the driver to decelerate the vehicle 2.

The vehicle control device 9 controls the drive of each unit of the vehicle 2 including the power source 7, the brake actuator 8, and the like, and is configured to include an electronic circuit having a well-known microcomputer including a CPU, a ROM, a RAM, and an interface as a main body. The vehicle control device 9 is, for example, electrically connected with various sensors and detectors such as the target detection sensor 3, the collision sensor 4, the driver state monitoring sensor 5, the control ON/OFF switch 6 described above, and is input with electric signals corresponding to the detection results. The vehicle control device 9 is electrically connected to each unit of the vehicle 2 such as the power source 7, the brake actuator 8, and outputs drive signals thereto. The vehicle control device 9 executes a stored control program based on various types of input signals and various types of maps input from the various types of sensors, detectors, and the like to output the drive signal to each unit of the vehicle 2 and control the drive thereof.

As illustrated in FIG. 1, the vehicle control device 9 of the present embodiment is configured to function conceptually include the DSSECU 91, the EFIECU 92, and the ECBECU 93. The DSSECU 91, the EFIECU 92, and the ECBECU 93 can exchange information such as detection signals and drive signals, control commands with each other. The vehicle control device 9 may configure the DSSECU 91, the EFIECU 92, and the ECBECU 93 with one ECU. The DSSECU 91 of the present embodiment is used for both the vehicle speed control unit and the automatic brake control unit, but the vehicle speed control unit and the automatic brake control unit may be configured by a different ECU.

The DSSECU 91 is an ECU that controls each unit of the vehicle 2 to realize the DSS function. The DSSECU 91 can execute, for the DSS function, the vehicle speed control for automatically accelerating the vehicle 2 regardless of the accelerator operation by the driver. The DSSECU 91 of the present embodiment can execute, for the vehicle speed control, an inter-vehicle distance control (hereinafter sometimes referred to as "ACC (Adaptive Cruise Control) control"), for example, of detecting the inter-vehicle distance between the vehicle 2 and the preceding vehicle of the vehicle 2 based on the obstacle information from the target detection sensor 3 and maintaining the inter-vehicle distance at a predetermined distance by automatically accelerating the vehicle 2 according to the inter-vehicle distance regardless of the accelerator operation to cause the vehicle 2 to follow the preceding vehicle. In the ACC control, the DSSECU 91 detects the inter-vehicle distance between the vehicle 2 and the preceding vehicle based on the relative physical quantity included in the obstacle information detected by the target detection sensor 3, computes a target acceleration/deceleration (target G) so that the inter-vehicle distance is maintained at a target inter-vehicle distance, and automatically controls the vehicle speed of the vehicle 2 based on the target acceleration/deceleration. The DSSECU 91 executes the vehicle speed control (ACC control) by controlling the power source 7, the brake actuator 8, and the like through the EFIECU 92, the ECBECU 93, and the like. The DSSECU 91 can turn ON/OFF the vehicle speed control, or ACC control herein, based on the control ON/OFF information from the control ON/OFF switch 6. The DSSECU 91 starts the vehicle speed control when the start operation by the passenger is detected by the control ON/OFF switch 6. The DSSECU 91 ends the vehicle speed control when the end operation by the passenger is detected by the control ON/OFF switch 6.

The DSSECU 91 can, for the DSS function, execute the MCB control for controlling the brake actuator 8, and the like of the vehicle 2 and reducing the motion energy of the vehicle 2 when the collision of the vehicle 2 is detected. The DSSECU 91 carries out the collision determination of the vehicle 2 based on the collision information from the collision sensor 4, for example. The DSSECU 91, for example, determines the collision of the vehicle 2 by determining whether or not the vehicle acceleration detected by the G sensor configuring the collision sensor 4 exceeded a predetermined threshold value set in advance. When the accelerations with respect to a plurality of directions is detected by the collision sensor 4, the DSSECU 91 may carry out the collision determination under the condition that one of the accelerations along each direction exceeded the threshold value set in advance. Furthermore, in addition to the collision determination using the sensor value of the G sensor described above, the air bag 10 mounted on the vehicle 2 may determine the collision of the vehicle 2 using a parameter (e.g., sensor value of the satellite sensor, etc.) other than the sensor value of the G sensor, and deployed in accordance therewith. Thus, the DSSECU 91 may carry out the collision determination according to the deployment status, and the like of the air bag 10 mounted on the vehicle 2 other than the sensor value of the G sensor configuring the collision sensor 4. The air bag 10 is typically an air bag for protecting the passenger of the vehicle 2. In the MCB control, the DSSECU 91 controls the vehicle 2 and automatically decelerates the vehicle 2 when the collision of the vehicle 2 is detected. In the MCB control, the DSSECU 91 controls the brake actuator 8 of the vehicle 2 to automatically decelerate the vehicle 2 regardless of other information when determined that the vehicle 2 collided with an obstacle exterior to the vehicle. The DSSECU 91 executes the MCB control by controlling the power source 7, the brake actuator 8, and the like through the EFIECU 92, the ECBECU 93, and the like.

The EFIECU 92 is an ECU that carries out the computation of the target drive/brake force based on the target acceleration/deceleration, and the like computed by the DSSECU 91, and controls the power source 7 based on the target drive/brake force to realize the acceleration of the vehicle 2. The ECBECU 93 is an ECU that carries out arbitration with the drive/brake force (deceleration side) required in other control functions based on the target drive/brake force computed by the EFIECU 92, and controls the brake actuator 8 based on the drive/brake force of after the arbitration to realize the deceleration of the vehicle 2. The EFIECU 92 and the ECBECU 93 realize the vehicle speed control (ACC control) and the MCB control by controlling the power source 7, the brake actuator 8, and the like based on the target acceleration/deceleration computed by the DSSECU 91, the drive/brake force computed by the EFIECU 92, and the like in response to a control command from the DSSECU 91.

The DSSECU 91 of the present embodiment suppresses the vehicle behavior not intended by the driver from occurring after the collision by prohibiting the execution of the vehicle speed control (ACC control) during a predetermined period after detection is made that the vehicle 2 collided with the vehicle exterior obstacle, and permitting the execution of the vehicle speed control after elapse of the predetermined period.

The predetermined period is a period arbitrarily set in advance, and for example, is set according to a period sufficient for the driver of the vehicle 2 to return from the panic state, and the like, and for the posture of the vehicle 2 to return to an appropriate posture if the vehicle 2 is in a drivable state after the vehicle 2 caused the collision. A starting time point of the predetermined period is a time point at which the collision of the vehicle 2 is detected, but for example, may be a time point at which the vehicle 2 came to a complete stop by the MCB control.

More specifically, if the vehicle speed control is being executed at the time of the detection of the collision of the vehicle 2, the DSSECU 91 interrupts the vehicle speed control during a predetermined time, and permits the return of the vehicle speed control after elapse of the predetermined time. As described above, when the vehicle speed control can be started in response to the start operation through the control ON/OFF switch 6, if the vehicle speed control is not being executed at the time of the detection of the collision of the vehicle 2, the DSSECU 91 does not permit the start of the vehicle speed control corresponding to the start operation during the predetermined period and permits the start of the vehicle speed control corresponding to the start operation after elapse of the predetermined time.

When the collision of the vehicle 2 is detected and the MCB control is executed, the DSSECU 91 may prohibit the vehicle speed control, as described above, before the elapse of the predetermined period, and permit acceleration of the vehicle 2 corresponding to the accelerator operation by the driver and steering (steering of steering wheel through an EPS actuator 11) of the vehicle 2 corresponding to the steering operation by the driver from after the MCB control is canceled until before elapse of the predetermined period to permit the execution of the vehicle speed control (ACC control) in addition to the acceleration and the steering of the vehicle 2 corresponding to the accelerator operation and the steering operation after elapse of the predetermined period. When the vehicle speed of the vehicle 2 becomes smaller than or equal to a predetermined value, for example, the DSSECU 91 cancels the MCB control after the vehicle 2 completely comes to a stop herein.

One example of a control flow in the vehicle control system 1 will now be described with reference to the flowchart of FIG. 2. Such control routine is repeatedly executed in a control period of every few ms to few dozen ms.

First, the DSSECU 91 of the vehicle control device 9 senses the sensor value of the G sensor configuring the collision sensor 4, the deployment status of the air bag 10, the driver state monitored by the driver state monitoring sensor 5, and the like for the collision determination process (step ST1).

The DSSECU 91 determines whether or not the vehicle acceleration, which is the sensor value of the G sensor configuring the collision sensor 4, is greater than a first threshold value set in advance (step ST2). The DSSECU 91 determines whether or not any of the vehicle accelerations along each direction is greater than the first threshold value when the acceleration with respect to a plurality of directions is detected by the G sensor. The first threshold value, for example, is set in advance as a value with which the collision of strength of an extent that the operation can no longer be carried out due to the breakage of the vehicle 2 can be determined according to an actual vehicle evaluation, and the like, and stored in a storage unit.

When determined that the vehicle acceleration is greater than the first threshold value (step ST2: Yes), that is, when determined that the collision of the strength of an extent that the operation can no longer be carried out due to the breakage of the vehicle 2 occurred, the DSSECU 91 proceeds to the process of step ST5, to be described later.

When determined that the vehicle acceleration is smaller than or equal to the first threshold value (step ST2: No), the DSSECU 91 determines whether or not the air bag 10 of the vehicle 2 is deployed (step ST3).

When determined that the air bag 10 of the vehicle 2 is deployed (step ST3: Yes), that is, when determination can be made that there is a possibility the vehicle 2 collided, the air bag 10 deployed and the field of front vision of the driver is blurred, the DSSECU 91 proceeds to the process of step ST5, to be described later.

When determined that the air bag 10 of the vehicle 2 is not deployed (step ST3: No), the DSSECU 91 determines whether or not the vehicle acceleration, which is the sensor value of the G sensor configuring the collision sensor 4, is greater than a second threshold value set in advance, and the driver state monitored by the driver state monitoring sensor 5 is in a non-drivable state such as unconscious state, panic state, and the like (step ST4). When the acceleration with respect to a plurality of directions is detected by the G sensor, the DSSECU 91 determines whether any of the vehicle accelerations along each direction is greater than the second threshold value. The second threshold value is set to a value smaller than the first threshold value. For example, the second threshold value is set in advance as a value with which a light collision weaker than the collision of the strength of an extent that the operation can no longer be carried out due to the breakage of the vehicle 2 can be determined, and stored in the storage unit.

When determined that the vehicle acceleration is smaller than or equal to the second threshold value, or when determined that the driver state is not a non-drivable state (step ST4: No), that is, when determination can be made that the collision has not occurred or when determined that the light collision occurred but the driver state is a drivable state, the DSSECU 91 terminates the current control period, and proceeds to the next control period.

When determined that the vehicle acceleration is greater than the second threshold value, and the driver state is the non-drivable state (step ST4: Yes), that is, when determined that the light collision occurred and the driver state is in the non-drivable state, the DSSECU 91 proceeds to the process of step ST5.

In the process of step ST5, the DSSECU 91 prohibits the execution of the vehicle speed control (ACC control herein) (step ST5). In this case, the DSSECU 91 once cancels and interrupts the vehicle speed control when the vehicle speed control is being executed, and does not accept the start operation (ON operation) of the vehicle speed control through the control ON/OFF switch 6 and does not permit the start of the vehicle speed control corresponding to the start operation when the vehicle speed control is not being executed.

The DSSECU 91 then executes the MCB control through the EFIECU 92, the ECBECU 93, and the like (step ST6).

The DSSECU 91 then determines whether or not the vehicle 2 stopped based on the vehicle speed, and the like, which is the sensor value of the vehicle speed sensor (not illustrated) (step ST7). When determined that the vehicle 2 is not stopped (step ST7: No), the DSSECU 91 repeatedly executes the determination of step ST7 until determining that the vehicle 2 stopped.

When determined that the vehicle 2 stopped (step ST7: Yes), the DSSECU 91 cancels the MCB control (step ST8).

The DSSECU 91 permits the acceleration of the vehicle 2 corresponding to the accelerator operation by the driver and the steering of the vehicle 2 corresponding to the steering operation by the driver (step ST9).

The DSSECU 91 then determines whether or not a predetermined time set in advance has elapsed (step ST10). For example, the DSSECU 91 determines whether or not the predetermined time has elapsed from the time point the collision of the vehicle 2 is detected. When determined that the predetermined time has not elapsed (step ST10: No), the DSSECU 91 repeatedly executes the determination of step ST10 until determining that the predetermined time has elapsed.

When determined that the predetermined time has elapsed (step ST10: Yes), the DSSECU 91 permits the execution of the vehicle speed control (step ST11), terminates the current control period, and proceeds to the next control period. In this case, the DSSECU 91 permits the return of the vehicle speed control when the vehicle speed control is being executed at the time of the collision, and permits the start of the vehicle speed control corresponding to the start operation through the control ON/OFF switch 6 when the vehicle speed control is not being executed.

The vehicle control system 1 configured as above can suppress the vehicle behavior not intended by the driver from occurring after the collision, since the execution of the vehicle speed control is prohibited during a predetermined period after detection is made that the vehicle 2 collided, and the execution of the vehicle speed control is permitted after elapse of the predetermined period. In other words, the vehicle control system 1 can suppress the vehicle behavior not intended by the driver from occurring by the vehicle speed control, for example, an event in which the vehicle 2 follows another vehicle, and the like in the adjacent lane and the vehicle 2 is automatically accelerated regardless of the accelerator operation by the driver from occurring by the ACC control, even if the position, the direction, and the like of the vehicle 2 is changed by the collision, for example, since the execution of the vehicle speed control is prohibited during predetermined period after the collision of the vehicle 2. In this case, the vehicle control system 1 interrupts the vehicle speed control during a predetermined period when the vehicle speed control is being executed, and does not accept the start operation through the control ON/OFF switch 6 during the predetermined period when the vehicle speed control is not being executed. As a result, the vehicle control system 1 can prohibit the vehicle speed control during the predetermined period not only when the vehicle 2 collided while the vehicle speed control is operating, but also for example, when the driver is in a panic state by the influence of the collision and the start operation of the speed control is mistakenly carried out through the control ON/OFF switch 6 after the collision although the vehicle speed control is non-operating and when the passenger moved by the inertia of the collision and unintendedly pushed the control ON/OFF switch 6. The vehicle control system 1 can prohibit the vehicle speed control for a predetermined period after the collision even if it is a system that does not have a function of performing the prediction of collision between the vehicle 2 and an object at the perimeter of the vehicle 2, and prohibiting and stopping the vehicle speed control (ACC control) in cooperation with the operation of a so-called pre-crash safety control for automatically putting brake and decelerating the vehicle 2 before the collision in correspondence therewith, for example. Furthermore, The vehicle control system 1 can prohibit the vehicle speed control during predetermined period after the collision even when the function of prohibiting and stopping the vehicle speed control in cooperation with the operation of the PCS control is provided, and when the vehicle speed control cannot be prohibited and stopped before the collision, for example, when the obstacle outside the detection region of the collision predicting sensor (target detection sensor 3) and the vehicle 2 collided. Therefore, the vehicle control system 1 can suppress the vehicle behavior not intended by the driver from occurring after the collision.

The vehicle control system 1 can suppress the MCB control and the vehicle speed control (ACC control) from control interfering since the execution of the vehicle speed control is prohibited during the predetermined period after detection is made that the vehicle 2 collided, and thus can sufficiently exhibit the performance of the MCB control. Thus, when the primary collision occurs in the vehicle 2, for example, the vehicle control system 1 can rapidly reduce the motion energy of the vehicle 2 and safely guide the passenger to avoid further collision after the primary collision.

The vehicle control system 1 executes the MCB control after the collision of the vehicle 2, and thereafter, permits the acceleration of the vehicle 2 corresponding to the accelerator operation by the driver, the steering of the vehicle 2 corresponding to the steering operation by the driver, and the like from after the MCB control is canceled until before the elapse of the predetermined period, and permits the execution of the vehicle speed control in addition to the acceleration of the vehicle 2 corresponding to the accelerator operation after elapse of the predetermined period. The vehicle control system 1 thus can more appropriately suppress the vehicle behavior not intended by the driver from occurring after the collision since the position, the direction, and the like of the vehicle 2 that changed after the collision of the vehicle 2 can be corrected by the operation of the driver so that the vehicle speed control (ACC control) can again be executed, for example.

The vehicle control system 1 can automatically return to the state in which the vehicle speed control can be started after elapse of the period in which the vehicle behavior not intended by the driver tends to easily occur as described above after the collision since the execution of the vehicle speed control is again permitted after the elapse of the predetermined period after the collision. As a result, the vehicle control system 1 can reduce the number of steps for the returning task of the vehicle speed control.

According to the vehicle control device 9 described above, the DSSECU 91 capable of executing the vehicle speed control for automatically accelerating the vehicle 2 regardless of the accelerator operation is arranged, DSSECU 91 prohibits the execution of the vehicle speed control during a predetermined period after detection is made that the vehicle 2 collided and permits the execution of the vehicle speed control after elapse of the predetermined period.

According to the vehicle control system 1 described above, the collision sensor 4 for detecting that the vehicle 2 collided with the object at the exterior of the vehicle 2, and the vehicle control device 9 capable of executing the vehicle speed control for automatically accelerating the vehicle 2 regardless of the accelerator operation are arranged, vehicle control device 9 prohibits the execution of the vehicle speed control during the predetermined period after detection is made by the collision sensor 4 that the vehicle collided and permits the execution of the vehicle speed control after elapse of the predetermined period.

Therefore, the vehicle control system 1 and the vehicle control device 9 can suppress the vehicle behavior not intended by the driver from occurring after the collision since the execution of the vehicle speed control is prohibited during the predetermined period after detection is made that the vehicle 2 collided and the execution of the vehicle speed control is permitted after elapse of the predetermined period.

The vehicle control device and the vehicle control system according to the embodiment of the present invention described above are not limited to the embodiment described above, and can be variously modified within the scope defined in the Claims.

In the above description, the vehicle control system 1 of the present embodiment has been described to have the function of the MCB control but is not limited thereto, and may not have the function of the MCB control.

In the above description, the DSSECU 91 of the vehicle control device 9 has been described as being able to execute the ACC control for the vehicle speed control, but is not limited thereto. For example, the DSSECU 91 may have a configuration of being able to execute a so-called cruise control (hereinafter referred to as CC (Cruise Control) control") for maintaining the vehicle speed of the vehicle 2 at the target vehicle speed for the vehicle speed control. In the CC control, the DSSECU 91 automatically accelerates the vehicle 2 regardless of the accelerator operation without using the target detection sensor 3, and repeats the acceleration travelling and the inertia travelling to automatically control the vehicle speed of the vehicle 2 so as to maintain the vehicle speed of the vehicle 2 at the arbitrarily set target vehicle speed. The DSSECU 91 executes the vehicle speed control (CC control) by controlling the power source 7, the brake actuator 8, and the like through the EFIECU 92, the ECBECU 93, and the like. In this case as well, the vehicle control system 1 can suppress the vehicle behavior not intended by the driver from occurring by the vehicle speed control after the collision and the event in which the vehicle 2 is unintendedly reaccelerated from occurring by the CC control since the execution of the vehicle speed control is prohibited during the predetermined period after the collision of the vehicle 2.

In the above description, the vehicle control device 9 has been described to permit the execution of the vehicle speed control after elapse of the predetermined period after the collision of the vehicle 2, but may permit the execution of the vehicle speed control even before elapse of the predetermined period if the return of the driver from the non-drivable state is confirmed, for example, by way of a reference example. In this case, the vehicle control device according to the reference example may presume that the driver returned from the non-drivable state when a predetermined operation by the driver is confirmed such as the operation of putting the shift range into a parking range and then again putting the shift range into a drive range, the operation of pushing a restoration switch, and the like, and permit the execution of the vehicle speed control.

REFERENCE SIGNS LIST 1 vehicle control system
2 vehicle
3 target detection sensor
4 collision sensor (collision detection device)
5 driver state monitoring sensor
6 control ON/OFF switch
7 power source
8 brake actuator
9 vehicle control device
10 air bag
91 DSSECU (vehicle speed control unit, automatic brake control unit)
92 EFIECU
93 ECBECU

The invention claimed is:
1. A vehicle control device comprising:
an electronic control unit (ECU) programmed to:
execute an inter-vehicle distance control for automatically accelerating a vehicle, regardless of an accelerator operation;
prohibit an execution of the inter-vehicle distance control during a predetermined period, after (1) a detection is made that the vehicle collided by a G sensor of the vehicle reporting to the ECU at least one vehicle acceleration above a light collision predetermined threshold but below a higher severe collision predetermined threshold, and (2) a determination is made by a driver monitoring sensor of the vehicle reporting to the ECU that a predetermined driver condition is satisfied, and
permit the execution of the inter-vehicle distance control after an elapse of the predetermined period;
wherein
the predetermined driver condition is determined when a driver state is detected as a panic state or an unconscious state, and
after the detection is made that the vehicle was just in a non-severe collision and that the predetermined driver condition is satisfied, execute an automatic brake control for controlling the vehicle and automatically decelerate the vehicle until the vehicle stops, and cancel the automatic brake control only after the vehicle stops, wherein the predetermined time period is independent of the automatic brake control, wherein after the automatic brake control is cancelled and during the predetermined time period of which the inter-vehicle distance control is prohibited, the ECU permits an acceleration of the vehicle in response to an accelerator operation by the driver, and after the predetermined time period, the ECU permits the execution of the inter-vehicle distance control in addition to the acceleration of the vehicle in response to the accelerator operation.

2. The vehicle control device according to claim 1, wherein while the inter-vehicle distance control is being executed at time of a detection of the collision of the vehicle, the ECU is programmed to interrupt the inter-vehicle distance control during the predetermined period, and permit a return of the inter-vehicle distance control after the elapse of the predetermined time.

3. The vehicle control device according to claim 1, wherein the ECU is further programmed to:

start the inter-vehicle distance control in response to a start operation, and while the inter-vehicle distance control is not being executed at the time of the detection of the collision of the vehicle, not permit a start of the inter-vehicle distance control in response to the start operation during the predetermined period, and permit the start of the inter-vehicle distance control in response to the start operation after the elapse of the predetermined time.

4. The vehicle control device according to claim 1, wherein the ECU is further programmed to:

execute the inter-vehicle distance control by detecting an inter-vehicle distance of the vehicle and a preceding vehicle of the vehicle, and automatically accelerate the vehicle in response to the inter-vehicle distance, regardless of the accelerator operation, so as to follow the preceding vehicle and maintain the inter-vehicle distance at a predetermined distance.

5. The vehicle control device according to claim 2, wherein the ECU is further programmed to:

start the inter-vehicle distance control in response to a start operation, and while the inter-vehicle distance control is not being executed at the time of the detection of the collision of the vehicle, not permit a start of the inter-vehicle distance control in response to the start operation during the predetermined period, and permit the start of the inter-vehicle distance control in response to the start operation after the elapse of the predetermined time.

6. The vehicle control device according to claim 2, wherein the ECU is further programmed to:

execute the inter-vehicle distance control by detecting an inter-vehicle distance of the vehicle and a preceding vehicle of the vehicle, and automatically accelerate the vehicle in response to the inter-vehicle distance, regardless of the accelerator operation, so as to follow the preceding vehicle and maintain the inter-vehicle distance at a predetermined distance.

7. The vehicle control device according to claim 3, wherein the ECU is further programmed to:

execute the inter-vehicle distance control by detecting an inter-vehicle distance of the vehicle and a preceding vehicle of the vehicle, and automatically accelerate the vehicle in response to the inter-vehicle distance, regardless of the accelerator operation, so as to follow the preceding vehicle and maintain the inter-vehicle distance at a predetermined distance.

8. A vehicle control system comprising:

a driver monitoring sensor configured to at least detect a predetermined driver condition;

a collision sensor configured to detect that a vehicle collided with an object at an exterior of the vehicle; and an electronic control unit (ECU) programmed to:

execute an inter-vehicle distance control for automatically accelerating the vehicle regardless of an accelerator operation, prohibit execution of the inter-vehicle distance control during a predetermined period after (1) a detection is made by the collision sensor that the vehicle collided by reporting to the ECU at least one vehicle acceleration above a light collision predetermined threshold but below a higher severe collision predetermined threshold and (2) a determination is made by the driver monitoring sensor of the vehicle reporting to the ECU that the predetermined driver condition is satisfied, and permit the execution of the inter-vehicle distance control after elapse of the predetermined period;

wherein the predetermined driver condition is determined when a driver state is detected as a panic state or an unconscious state, and after the detection is made that the vehicle was just in a non-severe collision and that the predetermined driver condition is satisfied, execute an automatic brake control for controlling the vehicle and automatically decelerate the vehicle until the vehicle stops, and cancel the automatic brake control only after the vehicle stops, wherein the predetermined time period is independent of the automatic brake control, wherein after the automatic brake control is cancelled and during the predetermined time period of which the inter-vehicle distance control is prohibited, the ECU permits an acceleration of the vehicle in response to an accelerator operation by the driver, and after the predetermined time period, the ECU permits the execution of the inter-vehicle distance control in addition to the acceleration of the vehicle in response to the accelerator operation.

\* \* \* \* \*